(12) United States Patent
Chaar et al.

(10) Patent No.: US 9,805,340 B2
(45) Date of Patent: Oct. 31, 2017

(54) METHODS AND APPARATUS FOR MANAGING AND DISTINGUISHING INSTANT MESSAGING SESSIONS AND THREADS

(75) Inventors: Jarir Kamel Chaar, Tarrytown, NY (US); Neal Martin Keller, Hawthorne, NY (US); Clifford Alan Pickover, Yorktown Heights, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/056,737

(22) Filed: Mar. 27, 2008

(65) Prior Publication Data

US 2008/0177835 A1 Jul. 24, 2008

Related U.S. Application Data

(63) Continuation of application No. 11/118,552, filed on Apr. 29, 2005.

(51) Int. Cl.
*G06F 15/16* (2006.01)
*G06Q 10/10* (2012.01)
*G06F 3/0482* (2013.01)
*H04L 12/58* (2006.01)

(52) U.S. Cl.
CPC ......... *G06Q 10/107* (2013.01); *G06F 3/0482* (2013.01); *H04L 51/04* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 5,390,295 | A | * | 2/1995 | Bates et al. .................... 715/789 |
| 5,600,346 | A | * | 2/1997 | Kamata et al. ................ 715/807 |
| 5,987,480 | A | * | 11/1999 | Donohue et al. .............. 715/207 |
| 5,995,103 | A | * | 11/1999 | Ashe .............................. 715/804 |
| 6,222,543 | B1 | * | 4/2001 | Knaapi et al. ................. 715/808 |
| 6,445,400 | B1 | * | 9/2002 | Maddalozzo, Jr. ... G06F 3/0481 715/781 |
| 7,117,452 | B1 | * | 10/2006 | Pavelski et al. ............... 715/792 |
| 7,139,797 | B1 | * | 11/2006 | Yoakum et al. ............... 709/204 |
| 7,328,242 | B1 | * | 2/2008 | McCarthy .............. G06Q 10/10 709/203 |

(Continued)

*Primary Examiner* — Mohamed Wasel
*Assistant Examiner* — Tsung Wu
(74) *Attorney, Agent, or Firm* — Ryan, Mason & Lewis, LLP

(57) ABSTRACT

A method of managing instant messaging communication over a computer network is provided. One or more instant messaging session windows are organized in an instant messaging session manager. At least one distinguishing session characteristic is attributed to each of the one or more instant messaging session windows. The at least one distinguishing session characteristic is at least one of a sound clip associated with a user of the session, an instant messaging session window background associated with a user of the session, and a change in at least one of a color and an intensity of the instant messaging session window. The at least one distinguishing session characteristic increases a likelihood of identification of each of the one or more instant messaging session windows.

19 Claims, 5 Drawing Sheets

(56) References Cited

U.S. PATENT DOCUMENTS

| | | | |
|---|---|---|---|
| 2003/0005058 A1* | 1/2003 | Sorotzkin | G06Q 10/107 709/206 |
| 2003/0023682 A1 | 1/2003 | Brown et al. | |
| 2003/0023684 A1 | 1/2003 | Brown et al. | |
| 2003/0225846 A1* | 12/2003 | Heikes et al. | 709/207 |
| 2005/0108329 A1* | 5/2005 | Weaver | H04L 12/1822 709/204 |
| 2005/0192934 A1* | 9/2005 | Ellis | G06F 17/30017 |
| 2006/0075029 A1* | 4/2006 | Kelso et al. | 709/206 |
| 2006/0101119 A1* | 5/2006 | Qureshi et al. | 709/206 |
| 2006/0149818 A1* | 7/2006 | Odell et al. | 709/206 |

\* cited by examiner

METHODS AND APPARATUS FOR MANAGING AND DISTINGUISHING INSTANT MESSAGING SESSIONS AND THREADS

CROSS-REFERENCE TO RELATED APPLICATION(s)

This application is a continuation of pending U.S. application Ser. No. 11/118,552 filed on Apr. 29, 2005, the disclosure of which is incorporated herein by reference.

FIELD OF THE INVENTION

The present invention relates generally to the field of instant messaging and, more particularly, to improved techniques for managing and distinguishing instant messaging sessions and instant messaging session threads.

BACKGROUND OF THE INVENTION

Instant messaging (IM) systems, such as those provided by America-On-Line Instant Messenger (AIM), Yahoo Messenger, Lotus Sametime, etc., are widespread and utilized in personal and professional environments. Often, while using an IM system, a user may have multiple IM sessions that are simultaneously active. Unfortunately, the windows of the different IM sessions may be easily confused, and messages intended for one user may accidentally be typed into an IM session window associated with another user. Further, within a given IM session window, different threads, or topics, of communication may easily be confused, particularly in chat sessions having multiple users.

While some features of IM systems may potentially be utilized to distinguish IM session windows, these features are not designed for the specific purpose of inherently distinguishing IM sessions and threads, and confusion may still result, see, for example, U.S. Patent Publication No. 2003/0225846 to Heikes et al. Sametime, AIM, and other systems, allow a small bit-mapped user icon to appear in a portion of an IM session window. While this may enable unique user customization, it does not provide an implicit or effortless means by which to distinguish IM session windows. Regarding IM session threads, a user may choose the color, font, and font size of messages displayed in an IM session window. However, while this may allow advanced users to establish settings that potentially distinguish session messages, such settings and resulting algorithms are not applied implicitly or effortlessly.

A set of customizable mechanisms is needed that allows a user to effortlessly distinguish IM session windows. Additionally, a set of customizable mechanisms is also needed that allows a user to distinguish threads or topics within a given IM session.

SUMMARY OF THE INVENTION

The present invention in an illustrative embodiment provides improved managing techniques for organizing and distinguishing instant messaging (IM) sessions and IM session threads within a given IM session. The embodiments of the present invention provide techniques for managing visual and audio characteristics that effortlessly distinguish user IM sessions and session threads.

In an illustrative embodiment of the present invention a method of managing instant messaging communication over a computer network is provided. One or more instant messaging session windows are organized in an instant messaging session manager. At least one distinguishing session characteristic is attributed to each of the one or more instant messaging session windows. The at least one distinguishing session characteristic may be a sound clip associated with a user of the session, a background of an instant messaging session window associated with a user of the session, and a change in at least one of a color and an intensity of the instant messaging session window. The at least one distinguishing session characteristic increases a likelihood of identification of each of the one or more instant messaging session windows.

In accordance with the illustrative embodiment of the present invention, one or more instant messaging threads are organized in each instant messaging session window. At least one distinguishing characteristic is attributed to each of the one or more instant messaging threads. The at least one distinguishing thread characteristic increases a likelihood of identification of each of the one of more instant messaging threads.

The present invention provides an improved system for IM sessions that enables effortless distinguishing of IM session windows via the use of visual and audio characteristics. The present invention also provides an organizational mechanism for ease in locating an intended receiver of an IM, and effortless distinguishing of topic threads in a given IM session. Finally, the present invention provides an organization scheme that enables easy tracking and response to threads, or topics, of communication within a given session window.

These and other objects, features, and advantages of the present invention will become apparent from the following detailed description of the illustrative embodiments thereof, which is to be read in connection with the accompanying drawings.

DETAILED DESCRIPTION OF PREFERRED EMBODIMENTS

As will be described in detail below, the present invention in the illustrative embodiment relates generally to the field of instant messaging (IM) and, more particularly, to improved techniques for distinguishing IM sessions and IM session threads through visual and audio mechanisms.

As used herein, the term "session" describes a communication between at least two users. Typically an IM session involves two users; however, it is possible, for example, in a chat room, to communicate with more than one other user in a session. A "session window," as used herein describes the computer entity into which messages between the communicating users are placed. The terms "thread" or "topic," as used herein are interchangeable, and describe a logical continuation of communication. It is possible, to have more than one thread of communication in a session window between two users. In a multiple user or chat session, many threads of communication are common. Throughout the description of the present invention, "User U" is a client of a system having an embodiment of the present invention.

Figure 1:
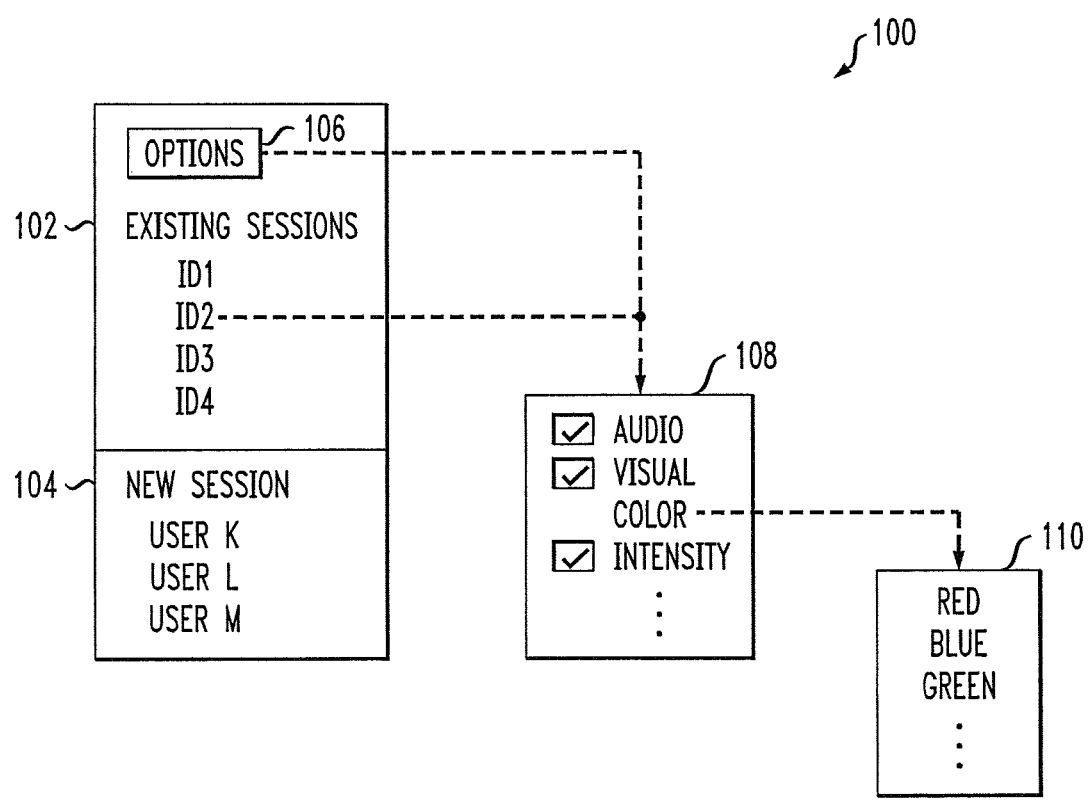
FIG. 1 is a diagram illustrating a session manager and associated windows for managing IM sessions, according to an embodiment of the present invention.

Referring initially to FIG. 1 a diagram illustrates a session manager and associated windows for managing active IM sessions, according to an embodiment of the present invention. Session manager 100 has an existing session window 102 and a new session window 104. Existing session window 102 displays existing, or active, IM sessions for a user of the system, for example, User U. In this embodiment four active sessions are shown, ID1, ID2, ID3, and ID4. Any number of sessions may be shown in existing session window 102, and it is also possible that no active sessions exist. For each session, a minimized icon may be provided along with or in place of identifying text of active sessions. The icon may include an image associated with a user with whom the session forms a communication link.

New session window 104 displays a list of those IM users with which User U may wish to establish a new IM session. Three such users are shown in this embodiment of the present invention, User K, User L and User M. Any number of users may be shown in new session window 104, and it is also possible that no users are displayed. Should User U wish to establish a new IM session with a user from the list provided in new session window 104, User U may select a user from new session window 104 of session manager 100.

The characteristics associated with a given IM session may be accessed by User U in two possible ways. First, User U may utilize an options menu 106 in existing session window 102 of session manager 100. Options menu 106 provides access to a session characteristics menu 108 that sets default characteristics for enactment upon the creation of a new session. These characteristics are able to be edited in session characteristics menu 108 so that they may be applied to any newly created IM session. Second, each existing session, for example, ID2, may be selected in order to provide access to session characteristic menu 108. When session characteristics menu 108 is reached in this manner it provides access to the characteristics of an individual session. For example, the characteristics of ID2 may be edited in this manner.

The characteristics provided in session characteristic menu 108 may include, for example, audio, visual, color and intensity options. When the color option is selected from session characteristics menu 108, a color menu 110 is provided, listing the possible colors that may be selected and attributed to an IM session, for example, red, blue, green, etc. Further, when the intensity option is selected from session characteristics menu 108, the intensity of the color of the session window is enabled to change as time increases since the last message was sent from or received at the session window. The intensity may change by increasing or decreasing, or by having the chosen color become gradually lighter or darker.

The selection of the audio option enables a sound clip to be played at specified times during the IM session. The sound clip is preferably associated with a user with whom the session forms a communication link. Finally, the selection of the visual option enables a visual object to appear in the session window, preferably as a watermark associated with a user with whom the session forms a communication link. The audio and visual options of the session windows are described in more detail below with regard to FIG. 2.

Figure 2:
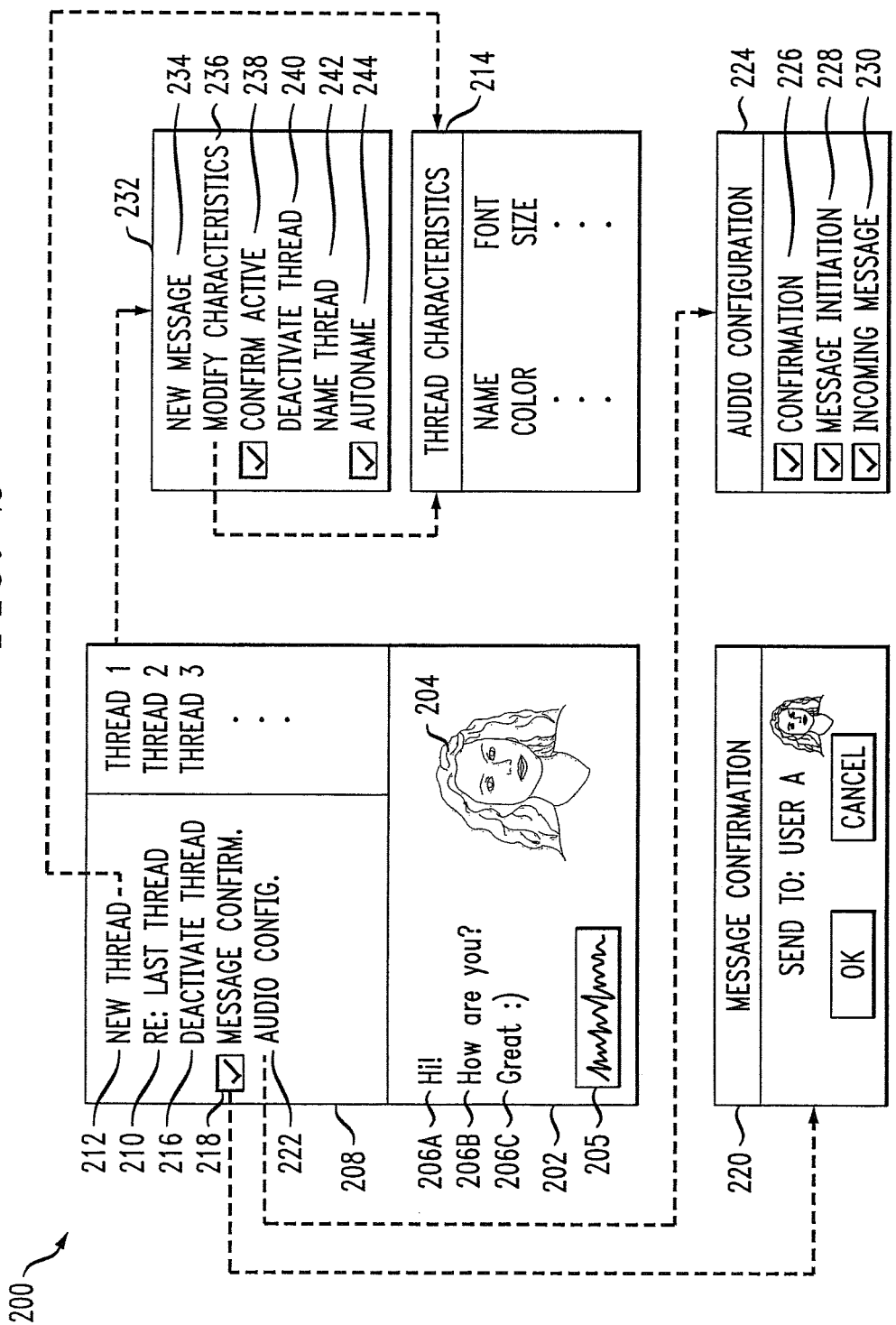
FIG. 2 is a diagram illustrating an individual session window and associated windows, according to an embodiment of the present invention.

Referring now to FIG. 2, a diagram illustrates a session window 200 and associated windows, according to an embodiment of the present invention. A message portion 202 of session window 200 includes a background that may include, for example, a watermark 204 of a user associated with the session, for example, User A, with whom this session forms a communication link. It is this background, or watermark, that may be selected as a visual option from session characteristic menu 108 of FIG. 1. Placing a watermark of the user in a background of the message display area makes it easily discernable and obvious as to whom messages will be sent to and received from. Many companies, schools, organizations and government agencies have photo banks of employees that can be easily implemented into an IM system.

Message portion 202 of session window 200, also shows a sound wave 205 of an audio file of the user associated with the session. Sound wave 205 may be played at times specified by User U, for example, when the IM session is opened, when a message is received, when an outgoing message is initiated, or upon confirmation of a message (as described below). It is this audio file that may be selected as an audio option from session characteristics menu 108 of FIG. 1, and whose configuration will be described in more detail below. Finally, message portion 202 of session window 200 includes multiple text lines 206A, 206B, 206C, etc., of the messages that have occurred between User U and User A.

A menu portion 208 of window 200 includes options regarding IM communication in the IM session. In order to respond to a thread of a last received message, User U may select a "Re: Last Thread" option 210. The same action may be accomplished simply by typing text into message portion 202 of session window 200. "New Thread" option 212 in menu portion 208 of window 200 provides the ability to initiate a new thread of communication. The selection of this option will prompt User U for thread characteristics such as, color, size, font, etc., via a thread characteristics menu 214. Alternatively, instead of selecting individual characteristics of the new thread, a new thread may be created with the current color, font, and size as shown in the text of "New Thread" option 212. The characteristics of this text are from a pool of possible thread characteristics that are unique among the existing threads. In menu portion 208 of session window 200, a thread may also be deactivated by selecting "Deactivate Thread" option 216, thereby returning the color, font, size, etc., to the pool of existing possible thread characteristics.

This embodiment of the present invention also allows for confirmation of outgoing messages during an IM session. A message confirmation indicator 218 in menu portion 208 of session window 200 indicates whether User U will be prompted for confirmation of outgoing messages. As shown in FIG. 2, a check indicates that User U will be prompted for confirmation by a confirmation box 220 prior to a message being sent. The option may be toggled by selecting "Message Confirmation" indicator 218. As shown in this embodiment of the present invention, confirmation box 220 may contain an image associated with the intended receiver, a user name associated with the intended receiver, as well as other identifying characteristics such as, for example, an audio clip associated with the intended receiver.

An "Audio Config." option 222 in menu portion 208 of window 200 allows User U to choose when to play an audio clip associated with a user with whom the session forms a communication link. When selected, "audio config." option 222 prompts User U with an audio configuration window 224. Audio configuration options include the ability to play the audio clip during the message confirmation 226, each time an outgoing message is initiated 228, or when a new incoming message is received 230. These options may be toggled in the same manner as described above.

Within a given IM session, confusion is common because of the occurrence and interleaving of concurrent communication threads. In these situations it can be difficult to discern what thread a given message is intended for. In the case when multiple users join a chat session, the multiple thread problem is exacerbated. The present invention further provides a mechanism to track ongoing threads or topics of communication. Menu portion 208 of session window 200 contains a list of active threads. User U may either define a name for each thread or allow an automatic artificial intelligent agent to create a suitable name based on the content of the thread. The embodiment of the present invention shown in FIG. 2, illustrates three threads, Thread 1, Thread 2, and Thread 3, however, any number of threads may be displayed.

Selecting any of the existing threads from menu portion 208 of session window 200 produces a thread menu 232 that provides several thread options. A new message may be sent with the selected thread's characteristics by selecting "New Message" option 234. The characteristics associated with the selected thread may be modified, thereby producing a thread characteristics menu 214, by selecting "Modify Characteristics" option 236. This is the same menu that may be produced by selecting new thread 212. If the selected thread is currently active a "Confirm Active" indicator 238 is checked in thread menu 232. The selected thread may be deactivated by selecting a "Deactivate Thread" option 240. A name may be assigned to the selected thread by selecting a "Name Thread" option 242. Finally, an "Autoname" indicator 244 is checked if the thread's name is determined by the artificial intelligent agent.

Figure 3:
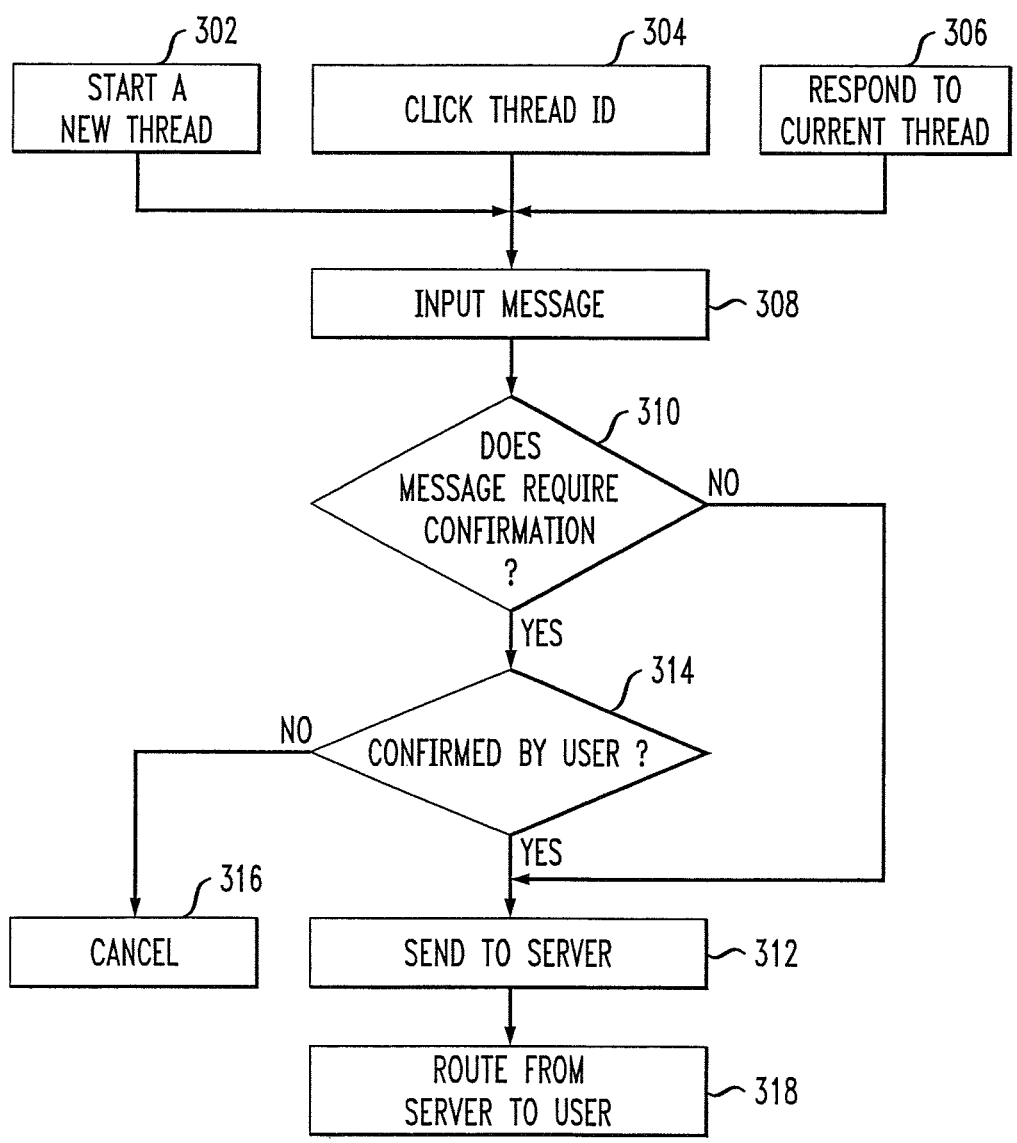
FIG. 3 is a flow diagram illustrating an outgoing message transmission methodology, according to an embodiment of the present invention.

Referring now to FIG. 3, a flow diagram illustrates an outgoing message transmission methodology according to an embodiment of the present invention. An outgoing message may be initiated by any of three actions. The user may: (i) select "New Thread" option 212 of FIG. 2, in block 302; (ii) select an existing thread of FIG. 2, in block 304; or (iii) respond to current thread in block 306 by typing in message window 202 of FIG. 2, or selecting "Re: Last Thread" option 210 in FIG. 2. If "New Thread" option 212 was selected in block 302, the characteristics of the thread are determined by selected characteristics in thread characteristic menu 214. If a one of the labeled threads was selected in block 304 or if the user responds to a current thread in block 306, the stored characteristics associated with the existing thread are used.

A message is input in block 308, and it is determined if the user has requested an outgoing confirmation in block 310, through the selection of "Message Confirmation" option 218 in FIG. 2. If the user has not requested a confirmation, the methodology proceeds to sending the message to the server in block 312. If the user has requested a confirmation, the computer displays message confirmation box 220 of FIG. 2, in block 314. If the message is confirmed, the methodology proceeds to send the message to the server in block 312, otherwise the message is cancelled and not sent in block 316, terminating the methodology. When the server receives the message, it decodes the intended receiver of the message and forwards the message to the associated user in block 318, thereby terminating the outgoing message transmission methodology.

Figure 4:
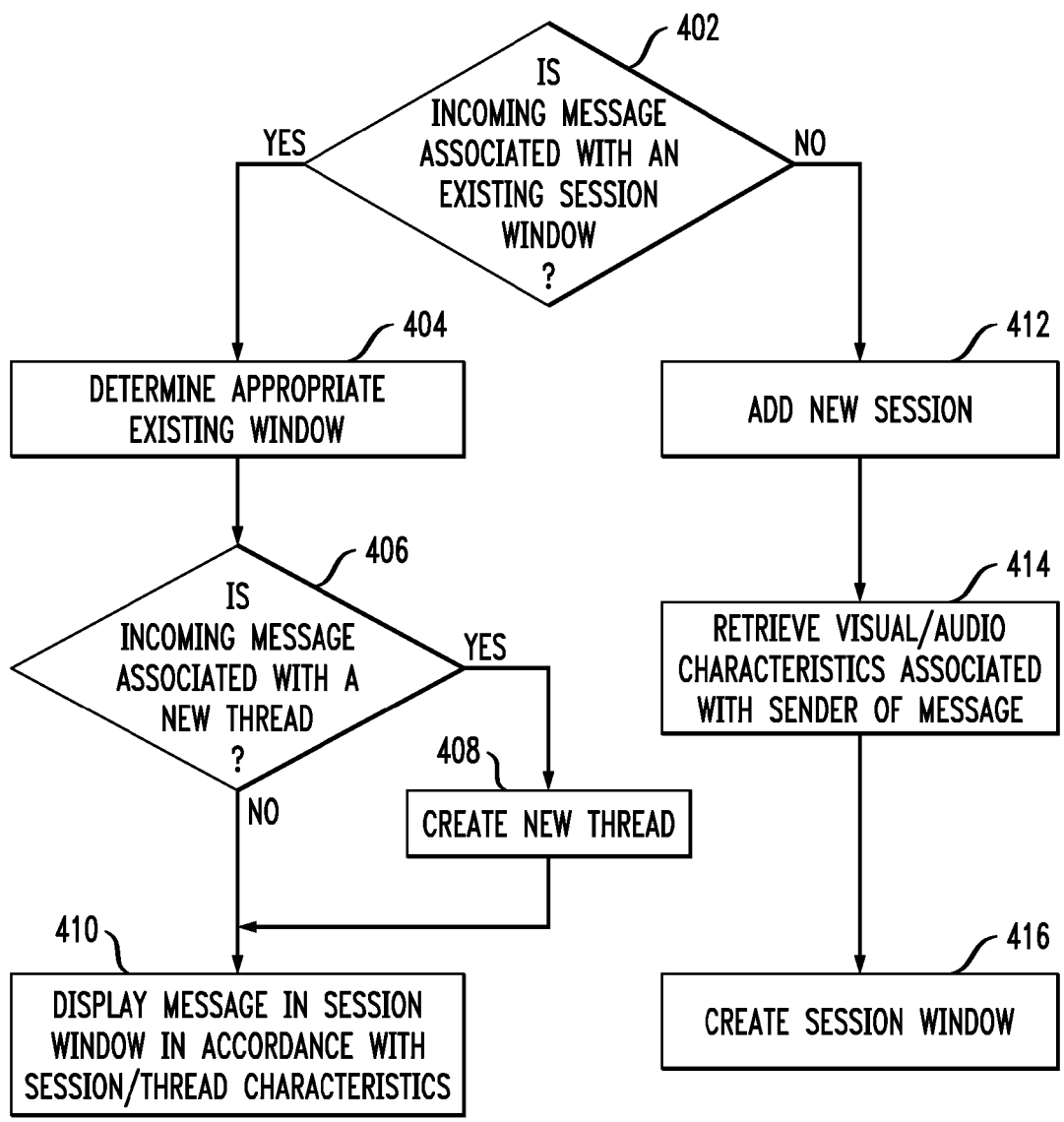
FIG. 4 is a flow diagram illustrating an incoming message acceptance methodology, according to an embodiment of the present invention.

Referring now to FIG. 4, a flow diagram illustrates an incoming message acceptance methodology, according to an embodiment of the present invention. This methodology begins in block 402, where an incoming message from a server arrives and it is determined whether there is an existing session window associated with the incoming message. If such a session window exists, the session window for the incoming message is identified in block 404. It is also determined whether this is a new thread for the session in block 406. If the message is for a new thread in that session window, the new thread is created with the characteristics associated with thread characteristics menu 214 of FIG. 2, in block 408. The message is then displayed in the session window in accordance with the thread characteristics in block 410, terminating the methodology.

If there was no existing session window for the incoming message, the computer adds a session to existing sessions of session manager 100 of FIG. 1, in block 412. If information regarding this user is not locally cached, the computer retrieves (or updates the cached copy of the) information from a central database in block 414. The user information may include the user's visual and audio session characteristics. The computer then creates a new single thread name and associates the default "new thread" characteristics, creates the message area with watermark image, plays optional audio, and displays the message, thereby creating the session window in block 416, and terminating the methodology.

Figure 5:
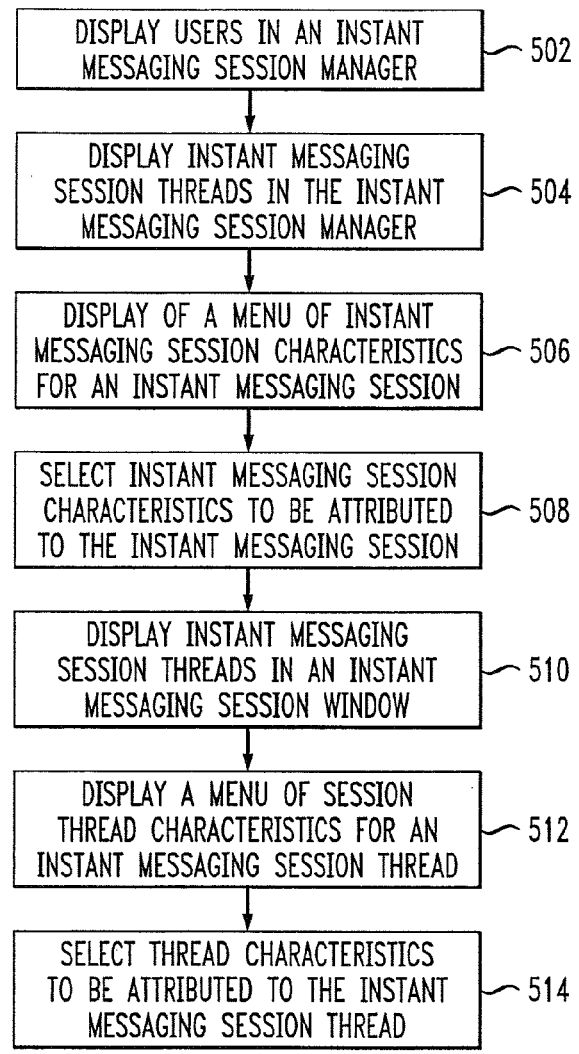
FIG. 5 is a flow diagram illustrating an instant messaging management methodology, according to an embodiment of the present invention.

Referring now to FIG. 5, a flow diagram illustrates an instant messaging communication management methodology, according to an embodiment of the present invention. The methodology begins in block 502 where users of the IM system are displayed in an IM session manager. These users may be selected to initiate a new IM session. In block 504, any existing IM sessions are displayed in the IM session manager. The name of each IM session is preferably displayed. This name may have been chosen by the user or automatically chosen by the system. In block 506, a menu of IM session characteristics is displayed for an IM session, and IM characteristics are selected to be attributed to the IM session in block 508.

In block 510, IM session threads are displayed in an IM session window. The names of the IM session threads are preferably displayed. These names may be chosen by the user or assigned by the IM system. In block 512, a menu of thread characteristics are displayed for a thread of the IM session, and thread characteristics are selected that are to be attributed to the IM thread in block 514.

Figure 6:
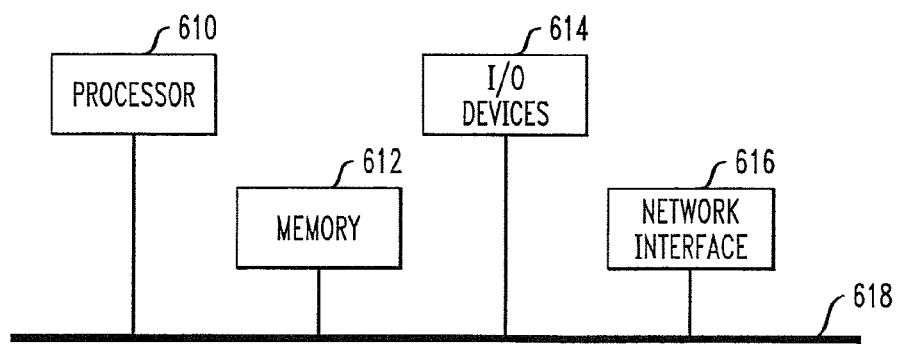
FIG. 6 is a block diagram illustrating a hardware implementation of a computing system in accordance with which one or more components/methodologies of the invention may be implemented, according to an embodiment of the present invention.

Referring now to FIG. 6, a block diagram illustrates an illustrative hardware implementation of a computing system in accordance with which one or more components/methodologies of the invention (e.g., components/methodologies described in the context of FIGS. 1-5) may be implemented, according to an embodiment of the present invention.

As shown, the computer system may be implemented in accordance with a processor 610, a memory 612, I/O devices 614, and a network interface 616, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering, for example audio or text, into the processing unit, and/or one or more output devices for outputting, for example audio or visual, associated with the processing unit.

Still further, the phrase "network interface" as used herein is intended to include, for example, one or more transceivers to permit the computer system to communicate with another computer system via an appropriate communications protocol. This may provide access to a central database having a set of mappings that associate given user names with images, audio clips, colors, etc. As described above, for example, many companies or organizations have images they use for employee web pages.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Therefore, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing instant messaging communication over a computer network, comprising the steps of:
   organizing one or more instant messaging session windows in an instant messaging session manager of a first user;
   attributing multiple distinguishing instant messaging session characteristics associated with an instant messaging session conducted with each of one or more separate users to each of the respective one or more separate users, each separate user associated with a respective one of the one or more instant messaging session windows displayed to the first user, and wherein said session characteristics for each respective instant messaging session comprise:
   a color of the respective instant messaging session window;
   intensity of the color of the respective instant messaging session window, wherein the intensity of the color increases continuously as time increases since a most recent message was sent from or received at the respective instant messaging session window;
   multiple audio clips associated with the respective separate user, wherein each respective one of the multiple audio clips is to be played at a distinct first-user-designated time during the respective instant messaging session, wherein the multiple audio clips comprise:
   a first audio clip played when the instant messaging session is opened;
   a second audio clip played when an incoming message is received;
   a third audio clip played when an outgoing message is initiated; and
   a fourth audio clip played upon confirmation of an outgoing message;
   displaying a first sound wave of the first audio clip in the respective instant messaging session window when the first audio clip is played;
   displaying a second sound wave of the second audio clip in the respective instant messaging session window when the second audio clip is played;
   displaying a third sound wave of the third audio clip in the respective instant messaging session window when the third audio clip is played;
   displaying a fourth sound wave of the fourth audio clip in the respective instant messaging session window when the fourth audio clip is played;
   a visual object identifying the respective separate user in a message display area of the respective instant messaging session window; and
   a name identifying the respective instant messaging session, wherein the name is automatically generated by an artificial intelligence agent based on the content of the respective instant messaging session; and
   projecting to the first user via the instant messaging session manager of the first user, the multiple distinguishing instant messaging session characteristics associated with an instant messaging session conducted with a particular separate user during an instant messaging session with the particular separate user;
   wherein the one or more distinguishing characteristics increase a likelihood of identification of the one or more instant messaging session windows; and
   organizing one or more instant messaging threads in each instant messaging session window, wherein the step of organizing one or more instant messaging threads comprises displaying a thread menu comprising a new message option, a modify characteristic option, a confirm active option, a deactivate thread option, a name thread option, and an autoname thread option.

2. The method of claim 1, wherein the step of organizing one or more instant messaging session windows comprises the step of displaying one or more existing instant messaging sessions in the instant messaging session manager.

3. The method of claim 1, wherein the step of organizing one or more instant messaging session windows comprises the step of displaying one or more users in the instant messaging session manager for initiation of a new instant messaging session window.

4. The method of claim 1, wherein the step of attributing at least one distinguishing session characteristic comprises the steps of:
   displaying a menu of distinguishing characteristics; and
   selecting at least one of the distinguishing characteristics to be attributed to each of one or more separate users, each separate user associated with a respective instant messaging session window displayed to the first user, to project to the first user the one or more distinguishing characteristics attributed to each separate user.

5. The method of claim 4, wherein the step of attributing at least one distinguishing characteristic comprises the step of playing a sound clip associated with a user with whom the instant messaging session provides a communication link.

6. The method of claim 4, wherein the step of attributing at least one distinguishing characteristic comprises the step of attributing a watermark associated with a user with whom the instant messaging session provides a communication link as the background of the instant messaging session window.

7. The method of claim 4, wherein the step of attributing at least one distinguishing characteristic comprises the step of changing the intensity of the color displayed for an instant messaging session window as time increases between instant messages.

8. The method of claim 4, wherein the step of attributing at least one distinguishing characteristic comprises the step of attributing a unique font, size and color to text within an instant messaging session window.

9. The method of claim 1, wherein the step of organizing one or more instant messaging sessions comprises displaying a confirmation that an instant message is being sent to an intended user before an instant message is sent.

10. The method of claim 9, wherein the confirmation comprises at least one of a picture associated with the intended user associated with a respective instant messaging session window displayed to the first user and a sound clip associated with the intended user associated with a respective instant messaging session window displayed to the first user.

11. The method of claim 1, further comprising the steps of:
attributing one or more thread characteristics to respective ones of the one or more instant messaging threads;
wherein the one or more thread characteristic increases a likelihood of identification of each of the one or more instant messaging threads.

12. The method of claim 1, wherein the step of organizing one or more instant messaging session threads comprises the step of displaying one or more instant messaging session threads in an instant messaging session window.

13. The method of claim 11, wherein the step of attributing at least one thread characteristic comprises the steps of:
displaying a menu of thread characteristics; and
selecting at least one of the thread characteristics to be attributed to an instant messaging thread.

14. The method of claim 13, wherein the thread characteristics comprise at least one of name, font, color and size.

15. Apparatus for transmitting managing instant messaging communication over a computer network, comprising:
a memory; and
at least one processor coupled to the memory and operative to:
organize one or more instant messaging session windows in an instant messaging session manager of a first user;
attribute multiple distinguishing instant messaging session characteristics associated with an instant messaging session conducted with each of one or more separate users to each of the respective one or more separate users, each separate user associated with a respective one of the one or more instant messaging session windows displayed to the first user, and wherein said session characteristics for each respective instant messaging session comprise:
a color of the respective instant messaging session window;
intensity of the color of the respective instant messaging session window, wherein the intensity of the color increases continuously as time increases since a most recent message was sent from or received at the respective instant messaging session window;
multiple audio clips associated with the respective separate user, wherein each respective one of the multiple audio clips is to be played at a distinct first-user-designated time during the respective instant messaging session, wherein the multiple audio clips comprise:
a first audio clip played when the instant messaging session is opened;
a second audio clip played when an incoming message is received;
a third audio clip played when an outgoing message is initiated; and
a fourth audio clip played upon confirmation of an outgoing message;
displaying a first sound wave of the first audio clip in the respective instant messaging session window when the first audio clip is played;
displaying a second sound wave of the second audio clip in the respective instant messaging session window when the second audio clip is played;
displaying a third sound wave of the third audio clip in the respective instant messaging session window when the third audio clip is played;
displaying a fourth sound wave of the fourth audio clip in the respective instant messaging session window when the fourth audio clip is played;
a visual object identifying the respective separate user in a message display area of the respective instant messaging session window; and
a name identifying the respective instant messaging session, wherein the name is automatically generated by an artificial intelligence agent based on the content of the respective instant messaging session; and
project to the first user via the instant messaging session manager of the first user, the multiple distinguishing instant messaging session characteristics associated with an instant messaging session conducted with a particular separate user during an instant messaging session with the particular separate user;
wherein the one or more distinguishing characteristics increase a likelihood of identification of the one or more instant messaging session windows; and
organize one or more instant messaging threads in each instant messaging session window, wherein the step of organizing one or more instant messaging threads comprises displaying a thread menu comprising a new message option, a modify characteristic option, a confirm active option, a deactivate thread option, a name thread option, and an autoname thread option.

16. The apparatus of claim 15, wherein the operation of organizing one or more instant messaging session windows comprises the operation of displaying one or more existing instant messaging sessions in the instant messaging session manager.

17. The apparatus of claim 15, wherein the at least one processor is further operative to: attribute at least one thread characteristic to each of the one or more instant messaging threads; wherein the at least one thread characteristic increases a likelihood of identification of each of the one or more instant messaging threads.

18. The apparatus of claim 15, wherein the operation of organizing one or more instant messaging threads comprises the operation of displaying one or more instant messaging session threads in an instant messaging session window.

19. An article of manufacture for managing instant messaging communication over a computer network, comprising a non-transitory machine readable medium containing one or more programs which when executed implement the steps of:

organizing one or more instant messaging session windows in an instant messaging session manager of a first user;

attributing multiple distinguishing instant messaging session characteristics associated with an instant messaging session conducted with each of one or more separate users to each of the respective one or more separate users, each separate user associated with a respective one of the one or more instant messaging session windows displayed to the first user, and wherein said session characteristics for each respective instant messaging session comprise:

a color of the respective instant messaging session window;

intensity of the color of the respective instant messaging session window, wherein the intensity of the color increases continuously as time increases since a most recent message was sent from or received at the respective instant messaging session window;

multiple audio clips associated with the respective separate user, wherein each respective one of the multiple audio clips is to be played at a distinct first-user-designated time during the respective instant messaging session, wherein the multiple audio clips comprise:

a first audio clip played when the instant messaging session is opened;

a second audio clip played when an incoming message is received;

a third audio clip played when an outgoing message is initiated; and a fourth audio clip played upon confirmation of an outgoing message;

displaying a first sound wave of the first audio clip in the respective instant messaging session window when the first audio clip is played;

displaying a second sound wave of the second audio clip in the respective instant messaging session window when the second audio clip is played;

displaying a third sound wave of the third audio clip in the respective instant messaging session window when the third audio clip is played;

displaying a fourth sound wave of the fourth audio clip in the respective instant messaging session window when the fourth audio clip is played;

a visual object identifying the respective separate user in a message display area of the respective instant messaging session window; and a name identifying the respective instant messaging session, wherein the name is automatically generated by an artificial intelligence agent based on the content of the respective instant messaging session; and projecting to the first user via the instant messaging session manager of the first user, the multiple distinguishing instant messaging session characteristics associated with an instant messaging session conducted with a particular separate user during an instant messaging session with the particular separate user;

wherein the one or more distinguishing characteristics increase a likelihood of identification of the one or more instant messaging session windows, and organizing one or more instant messaging threads in each instant messaging session window, wherein the step of organizing one or more instant messaging threads comprises displaying a thread menu comprising a new message option, a modify characteristic option, a confirm active option, a deactivate thread option, a name thread option, and an autoname thread option.

\* \* \* \* \*